United States Patent
Sawada et al.

(10) Patent No.: US 9,261,884 B2
(45) Date of Patent: Feb. 16, 2016

(54) APPARATUS FOR DIVIDING AND SUPPLYING GAS AND METHOD FOR DIVIDING AND SUPPLYING GAS BY USE OF THIS APPARATUS

(71) Applicant: Fujikin Incorporated, Osaka (JP)

(72) Inventors: Yohei Sawada, Osaka (JP); Nobukazu Ikeda, Osaka (JP); Ryousuke Dohi, Osaka (JP); Kouji Nishino, Osaka (JP)

(73) Assignee: FUJIKIN INCORPORATED, Osaka (JP)

( * ) Notice: Subject to any disclaimer, the term of this patent is extended or adjusted under 35 U.S.C. 154(b) by 59 days.

(21) Appl. No.: 13/779,101

(22) Filed: Feb. 27, 2013

(65) Prior Publication Data

US 2013/0220433 A1 Aug. 29, 2013

(30) Foreign Application Priority Data

Feb. 29, 2012 (JP) ................................. 2012-043090

(51) Int. Cl.
G05D 7/06 (2006.01)

(52) U.S. Cl.
CPC ............ G05D 7/0641 (2013.01); G05D 7/0664 (2013.01); Y10T 137/0368 (2015.04); Y10T 137/776 (2015.04)

(58) Field of Classification Search
CPC . G05D 7/0641; G05D 7/0664; G05D 7/0635; G01F 15/005; G01F 25/0007; Y10T 137/0368; Y10T 137/776
USPC ............ 700/282; 702/45; 137/601.01, 601.14
See application file for complete search history.

(56) References Cited

U.S. PATENT DOCUMENTS

| 5,865,205 | A  | * | 2/1999 | Wilmer ............................ 137/2 |
| 6,142,163 | A  | * | 11/2000 | McMillin et al. ............... 137/14 |
| 6,178,995 | B1 |  | 1/2001 | Ohmi et al. |
| 6,216,726 | B1 | * | 4/2001 | Brown et al. .................. 137/486 |
| 6,581,623 | B1 | * | 6/2003 | Carpenter et al. ............. 137/113 |
| 7,069,944 | B2 | * | 7/2006 | Morikawa et al. .......... 137/487.5 |
| 7,096,093 | B1 | * | 8/2006 | Hansen et al. ................ 700/282 |
| 7,133,785 | B2 | * | 11/2006 | Larson et al. ................... 702/45 |
| 7,155,319 | B2 | * | 12/2006 | Nangoy et al. ................ 700/281 |

(Continued)

FOREIGN PATENT DOCUMENTS

| JP | 11-212653 A | 8/1999 |
| WO | 2004/114038 A1 | 12/2004 |

*Primary Examiner* — John K Fristoe, Jr.
*Assistant Examiner* — Michael R Reid
(74) *Attorney, Agent, or Firm* — Griffin and Szipl PC (57) ABSTRACT

A gas dividing/supplying apparatus includes a pressure-type flow control system, a plurality of divided flow passages connected in parallel with each other and through which gas flowing from the pressure-type flow control system is divided and supplied to a process chamber, thermal-type mass flow sensors disposed in the divided flow passages, respectively, motor-operated valves disposed on a downstream side of the thermal-type mass flow sensors, respectively, and switching-type controllers that control opening and closing of the motor-operated valves, respectively, and, in the apparatus, the switching-type controllers perform switching between valve opening control for maintaining the motor-operated valves at a predetermined fixed valve opening degree based on a valve opening control command signal and divided flow control for regulating an opening degree of each of the motor-operated valves by feedback control based on a flow detection signal of the thermal-type mass flow sensor by a divided flow control command signal.

6 Claims, 8 Drawing Sheets

(56) References Cited

U.S. PATENT DOCUMENTS

| | | | |
|---|---|---|---|
| 7,881,829 B2 * | 2/2011 | Yoneda et al. | 700/282 |
| 8,496,022 B2 | 7/2013 | Sugiyama et al. | |
| 2008/0269951 A1 * | 10/2008 | Boger | 700/282 |
| 2011/0094596 A1 | 4/2011 | Sugiyama et al. | |

* cited by examiner

Prior art

Prior art

FIG. 7

Prior art

FIG. 8

Prior Art

FIG. 9
Prior Art

APPARATUS FOR DIVIDING AND SUPPLYING GAS AND METHOD FOR DIVIDING AND SUPPLYING GAS BY USE OF THIS APPARATUS

This application claims priority from Japanese Patent Application No. 2012-043090, filed Feb. 29, 2012, the entire disclosure of which is incorporated herein by reference.

TECHNICAL FIELD OF THE INVENTION

The present invention relates to an improvement in a gas dividing and supplying system that divides and supplies gas from a pressure-type flow control system, disposed on a side of a gas supply source, to a plurality of divided flow passages, each of which is provided with a thermal-type mass flow sensor (MFM, which pertains to a thermal-type mass flow meter). More particularly, the present invention relates to a gas dividing and supplying apparatus that is capable of easily and reliably preventing the occurrence of excessive flow-in of gas (i.e., overshooting) at the beginning or initiation of supplying gas to each divided flow passage, and the present invention relates to a gas dividing and supplying method that employs the apparatus.

BACKGROUND OF THE INVENTION

Figure 5:
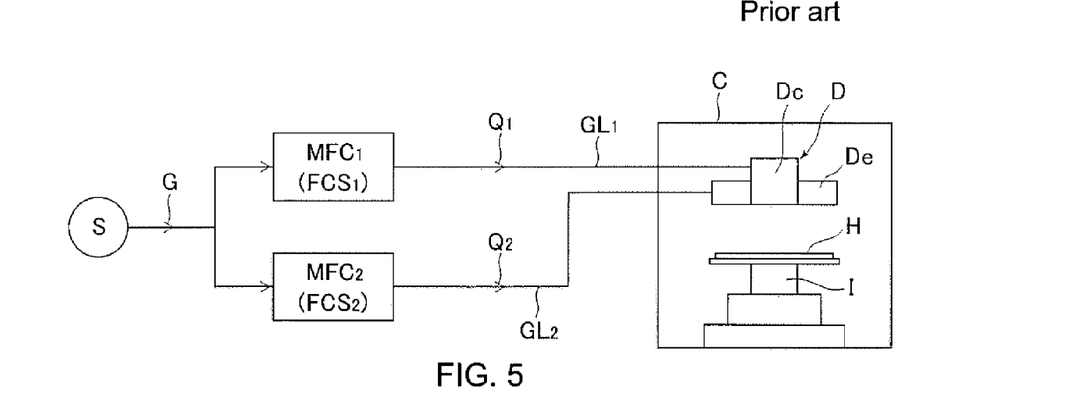
FIG. 5 is a system view showing an example of a conventional gas dividing/supplying apparatus.

In recent years, in the field relative to semiconductor manufacturing equipment, a so-called "gas dividing and supplying system" has been employed in many cases with the enlargement of a process chamber, and various types of gas dividing and supplying systems have been developed. FIG. 5 shows an example of a conventional gas dividing/supplying apparatus that uses a thermal-type MFC (mass flow controller) or a pressure-type FCS (flow control system), and gas G emitted from a gas supply source S is divided and supplied to a process chamber C through the flow control devices in the ratio of a flow rate $Q_1$ to a flow rate $Q_2$. More specifically, FIG. 5 shows a chamber C; gas dischargers D, Dc and De; a wafer H; and a supporting device I.

By the way, in the flow control device MFC (or FCS), when gas starts to be supplied, a gas flow-in phenomenon (so-called "overshooting" phenomenon) is liable to easily occur, and, especially in the thermal-type flow control device MFC, the occurrence of the overshooting phenomenon is inevitable.

Figure 6:
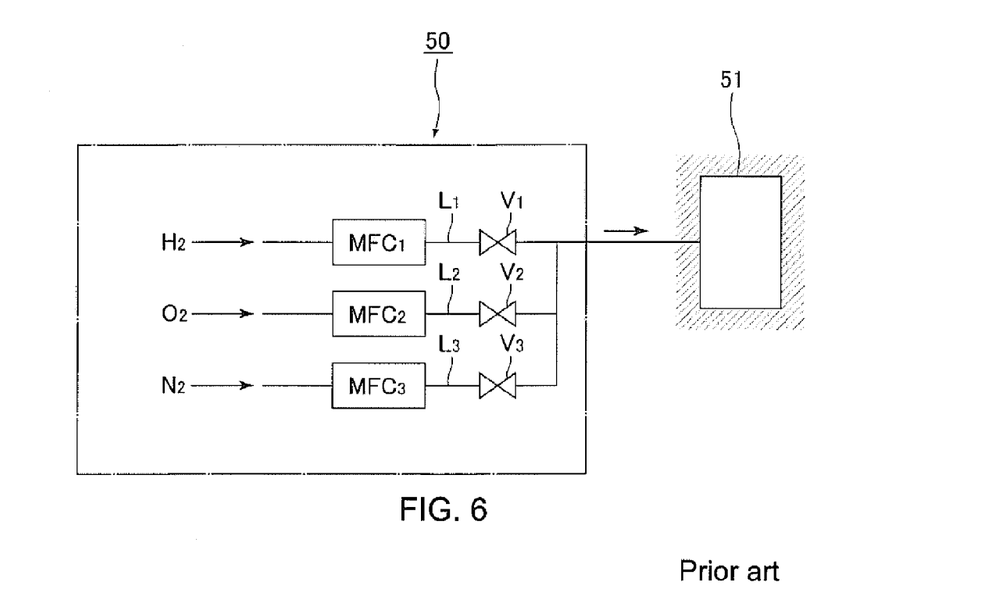
FIG. 6 is a system view showing an example of a gas supply apparatus that uses a conventional thermal-type mass flow controller.

For example, based on results obtained by analyzing the cause of a fluid overshooting phenomenon that has occurred immediately after starting the supply of gas by use of a gas supplying apparatus, arranged as shown in FIG. 6, the present inventors have determined that, in a gas supplying apparatus 50 that uses the conventional mass-flow controllers, (a) most gas that causes the overshooting phenomenon is gas that stagnates in the pipe passages $L_1$ to $L_3$ by which changeover valves $V_1$ to $V_3$ are connected to mass-flow controllers $MFC_1$ to $MFC_3$, respectively, and (b) the structure itself of each mass-flow controller $MFC_1$ to $MFC_3$ increases the stagnation of gas that causes the overshooting phenomenon. In FIG. 6, reference symbol 51 designates a chamber.

Figure 7:
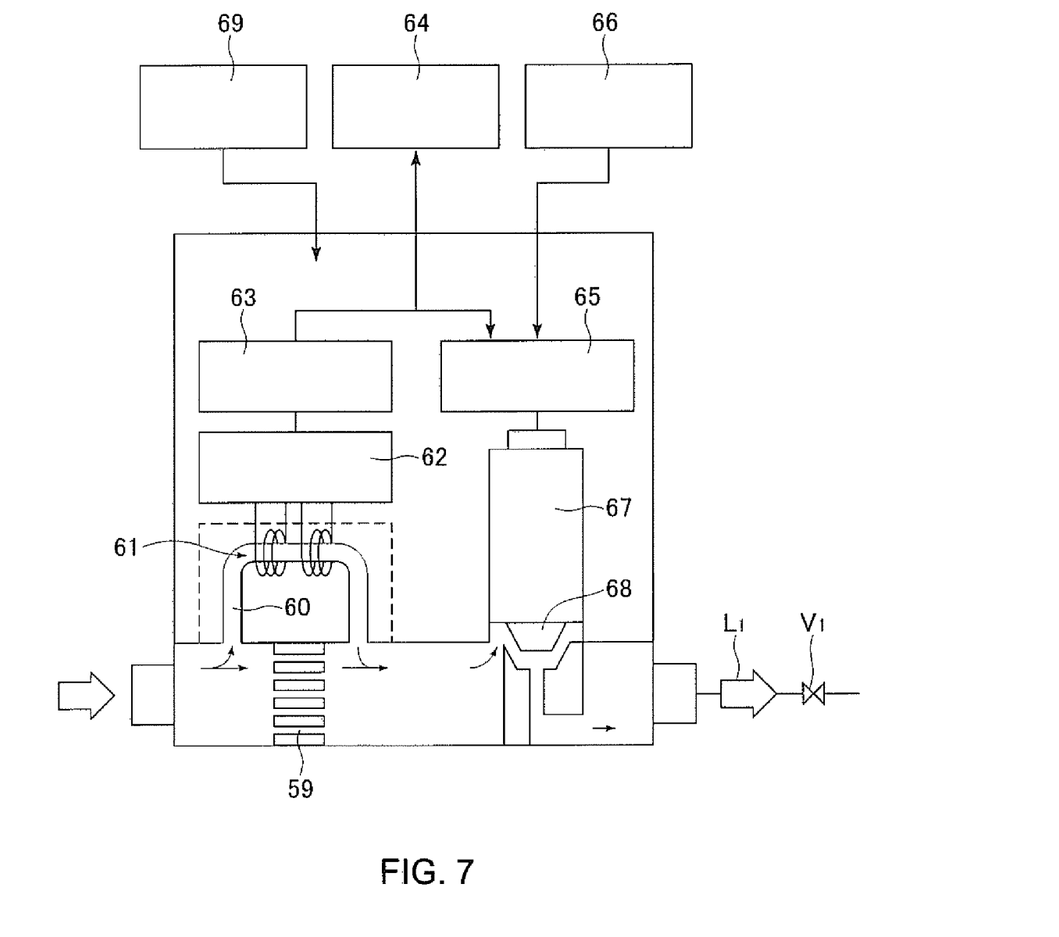
FIG. 7 is a descriptive schematic view showing a structure of a thermal-type mass flow controller.

In more detail, as shown in FIG. 7, which is a block diagram showing a basic structure of a conventional mass-flow controller, gas that has flowed in from the primary side is divided into gas portions flowing through a laminar flow bypass 59 and a sensor bypass 60, and the mass flow of the gas is determined by a sensor 61 in the form of temperature change in proportion thereto, and the determined temperature change is converted into electric signals in a bridge circuit 62, and the resulting electric signals are output through an amplifier circuit 63 and others to a display 64 and to a comparison control circuit 65 as linear voltage signals, respectively. Meanwhile, set signals transmitted from outside are input from a setter 66 into the comparison control circuit 65, in which the difference between the aforementioned detected signals and the set signals is calculated, and the resulting signal difference is sent into a valve drive 67, which controllably opens or closes a flow control valve 68 in a direction in which the signal difference becomes zero. In the FIG. 7, reference symbol 69 designates a power unit.

Now, if the changeover valve $V_1$ mounted on the secondary side is suddenly closed while the mass-flow controller is in operation, the gas flowing through the sensor 61 comes to a standstill and, therefore, the control system of the mass-flow controller works transiently to increase the flow of gas, and the flow control valve 68 is opened. As a result, the gas pressure in the secondary-side line $L_1$ rises, causing the gas to stagnate therein. Thereafter, when the changeover valve $V_1$ is opened, the stagnating gas rushes into the chamber side through the changeover valve $V_1$, causing the gas overshooting phenomenon.

Therefore, the occurrence of overshooting of gas in the gas dividing/supplying apparatus inevitably causes a decrease in operating efficiency of semiconductor manufacturing facilities, or a decrease in quality of products. Therefore, it is necessary to prevent the occurrence of overshooting as much as possible.

On the other hand, in recent years, in this type of gas dividing/supplying apparatus of semiconductor manufacturing equipment, a desire to reduce this apparatus in size and in cost has increased. To meet such a desire, as shown in FIG. 8, a gas dividing/supplying apparatus has been developed in which the flow of a total quantity Q of gas supplied from a gas supply source is controlled by use of a pressure-type flow control system (FCS) 4, and in which divided flow quantities $Q_1$ to $Q_n$ of gas are controlled in divided flow passages $L_1$ to $L_n$, respectively.

Figure 8:
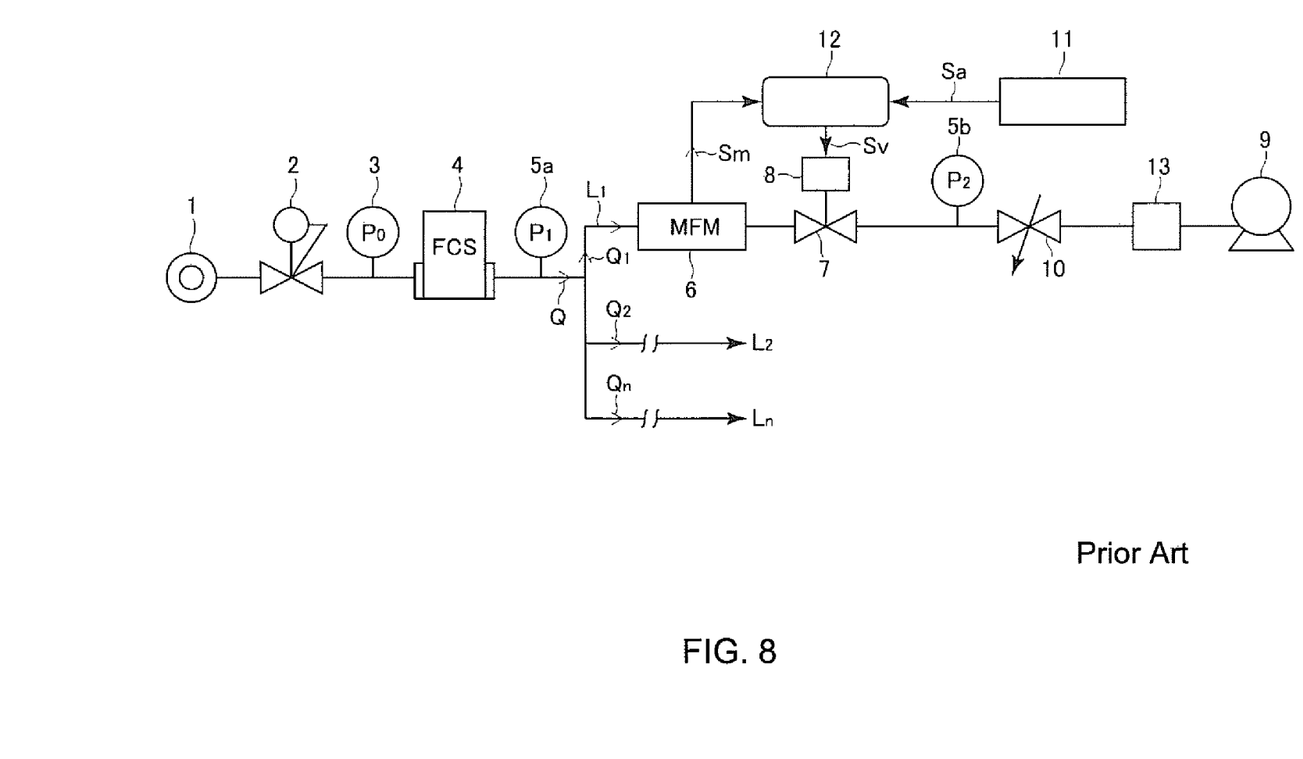
FIG. 8 is a descriptive schematic view showing an example of a gas dividing/supplying apparatus that uses a conventional PID controller.

In FIG. 8, reference symbol 1 designates the gas supply source, reference symbol 2 designates a pressure regulator, reference symbol 3 designates a pressure sensor measuring $P_o$, reference symbol 4 designates a pressure-type flow control system (FCS), reference symbols 5a and 5b designate pressure gauges measuring $P_1$ and $P_2$, respectively, reference symbol 6 designates a thermal-type mass flow sensor (MFM), reference symbol 7 designates a motor-operated valve, reference symbol 8 designates a valve drive unit, reference symbol 9 designates a vacuum pump, reference symbol 10 designates a throttle valve, reference symbol 11 designates a signal generator, reference symbol 12 designates a PID controller, reference symbol 13 designates a process chamber, reference symbol Sm designates a flow detection signal, reference symbol Sa designates a flow setting signal, and reference symbol Sv designates a valve driving signal.

In the gas dividing/supplying apparatus of FIG. 8, a total flow quantity Q of gas whose flow has been controlled by the pressure-type flow control system 4 is supplied to divided flow passages $L_1$, $L_2$, and $L_n$ in divided flow quantities $Q_1$, $Q_2$, and $Q_n$, respectively. In other words, divided flow quantities $Q_1$, $Q_2$, and $Q_n$ of gas flowing through the divided flow passages $L_1$, $L_2$, and $L_n$, respectively, are supplied to the chamber 13 in such a way that, for example, in the divided flow passage $L_1$, the motor-operated valve 7 is subjected to feedback control by means of the controller 12 according to a flow detection signal Sm emitted from the thermal-type mass flow sensor (MFM) 6, and, as a result, the gas is controlled to have a divided flow quantity $Q_1$ equal to a flow setting signal Sa emitted from the signal generator 11 and is supplied to the chamber 13. In FIG. 8, a divided flow control mechanism of the divided flow passages $L_1$, $L_2$, and $L_n$ is omitted.

Figure 9:
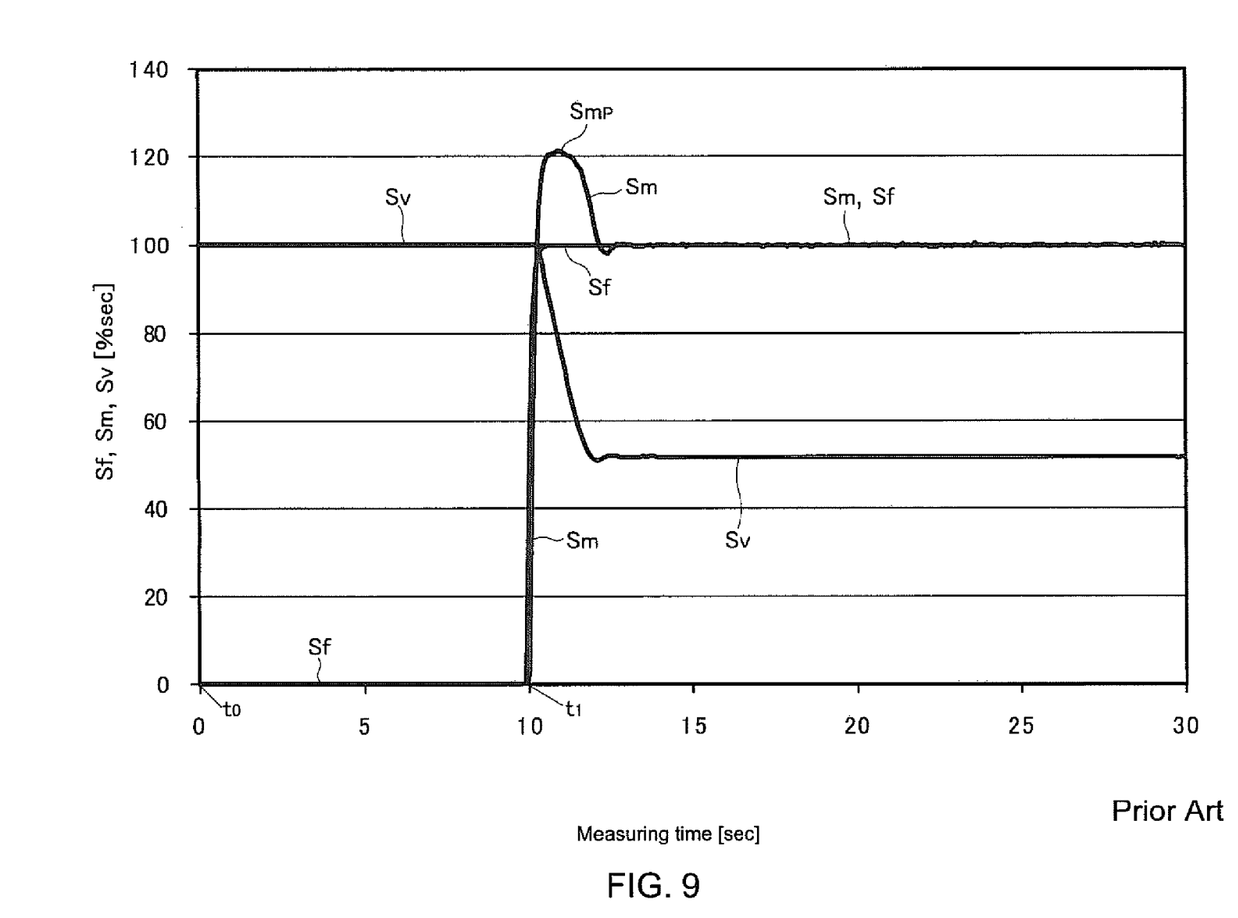
FIG. 9 is a descriptive graphical view of divided gas flow characteristics when gas starts to be admitted in the gas dividing/supplying apparatus of FIG. 8.

However, also in the gas dividing/supplying apparatus, a peak Smp appears in the flow detection signal Sm of the thermal-type mass flow sensor (MFM) 6, and so-called overshooting occurs in the gas having a flow quantity $Q_1$ flowing through the divided flow passage $L_1$ as shown in FIG. 9, for example, immediately after starting a gas admission into the divided flow passage $L_1$ (referred to as "when gas is admitted for supply") by inputting a flow setting signal Sa from the signal generator 11 and by starting the pressure-type flow control system (FCS) 4.

In other words, a peak flow detection signal Smp, as shown in FIG. 9, will occur in the flow detection signal Sm, and overshooting will occur in gas having a divided flow quantity $Q_1$ if the flow setting signal Sa equivalent to a rated flow (100% Full Scale (F.S.) flow output) is input to the controller 12 at a point $t_0$, and gas is then supplied to the thermal-type mass flow sensor (MFM) 6 at a point $t_1$, and a flow detection signal Sm is input to the controller 12 as shown in FIG. 9.

PRIOR ART DOCUMENTS

Patent Documents

[Patent Document 1] WO2004-114038.
[Patent Document 2] Japanese Published Unexamined Patent Application No. H11-212653.

Problems to be Solved by the Invention

The present invention has been made to solve the aforementioned problem observed in a conventional gas dividing/supplying apparatus, and it is a main object of the present invention to provide a gas dividing/supplying apparatus capable of easily, at low cost, and substantially, completely preventing the occurrence of overshooting of gas when the gas starts to be admitted into divided flow passages.

Means for Solving the Problems

Figure 1:
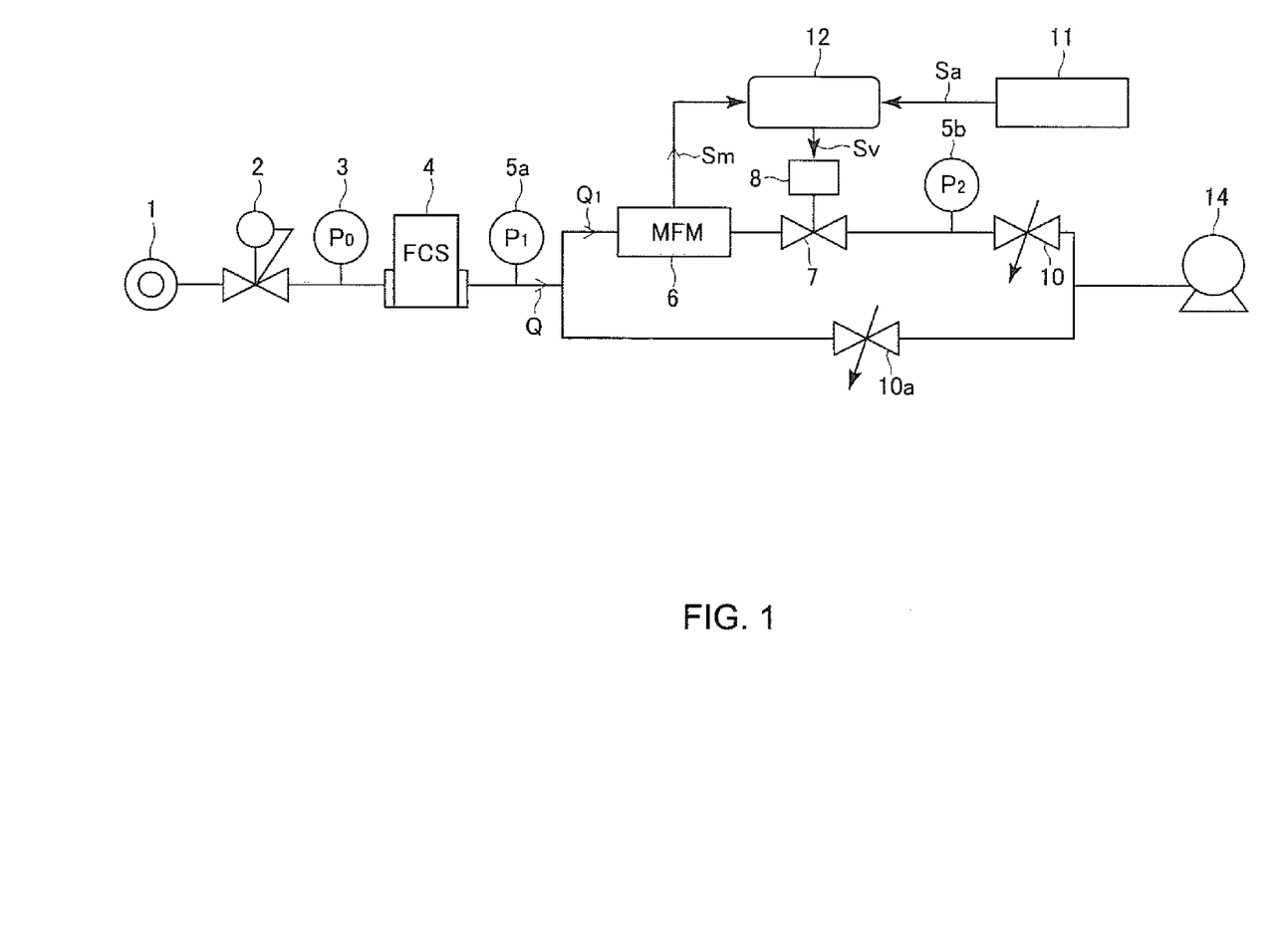
FIG. 1 is a system view of a basic testing apparatus according to the present invention.

In order to analyze overshooting caused in the gas dividing/supplying apparatus of FIG. 8 when gas starts to be admitted, the present inventors created an evaluation testing apparatus as shown in FIG. 1, and studied an operational state, etc., of the apparatus when gas is admitted (i.e., at the initiation of gas flow). Herein, the evaluation testing apparatus of FIG. 1 is substantially the same in structure as the divided flow control device of FIG. 8 except that the evaluation testing apparatus of FIG. 1 has a bypass passage provided with a throttle valve that is arranged in parallel with the structures to be tested, which are connected to the vacuum pump 14.

As a result, obtained test results are the same as in the instance of FIG. 9, and, as shown in FIG. 9, a flow setting signal Sa equivalent to a 100% flow quantity is input to the controller 12 of FIG. 1 at a point $t_0$, and, accordingly, a valve driving signal Sv is input to the valve drive unit 8 from the controller 12, and the motor-operated valve 7 is instantaneously kept in a fully opened state. Thereafter, the fully opened state of the motor-operated valve 7 is maintained until a flow detection signal Sm is input to the controller 12 from the thermal-type mass flow sensor (MFM) 6, so that the valve driving signal Sv is regulated by feedback control.

When the pressure-type flow control system (FCS) 4 is actuated, and the flow output Sf of the pressure-type flow control system (FCS) 4 reaches a value equivalent to a 100% flow quantity at the point $t_1$, i.e., when flow control performed by the pressure-type flow control system starts, and gas starts to be supplied to the thermal-type mass flow sensor (MFM) 6, the flow detection signal Sm emitted from the thermal-type mass flow sensor (MFM) 6 is increased, and so-called feedback control is performed in the controller 12, and, as a result, the valve driving signal Sv is regulated so that gas having a set flow quantity corresponding to the flow setting signal Sa flows, and the opening degree of the motor-operated valve 7 is controlled from the fully opened state to a predetermined opening degree. That is, the valve driving signal Sv becomes 0 at a point at which the flow setting signal Sa and the flow detection value Sm of the thermal-type mass flow sensor (MFM) 6 coincide with each other, and the opening degree of the motor-operated valve 7 is maintained at a fixed opening degree at which gas having a set flow quantity Q flows.

In other words, gas supply to the thermal-type mass flow sensor (MFM) 6 is delayed between the point $t_0$ and the point $t_1$, and, as a result, the opening degree of the motor-operated valve 7 is ruled by the flow setting signal Sa, and the motor-operated valve 7 is kept in the fully opened state. This time delay exists until the motor-operated valve 7, which is in the fully opened state, reaches a valve opening degree equivalent to a predetermined set flow quantity Sa by being successively driven in a closing direction by inputting the flow detection signal Sm and, therefore, it is understood that gas that flows into the motor-operated valve 7 that is in the fully opened state during this delay time appears as so-called overshooting.

SUMMARY OF THE INVENTION

Figure 2:
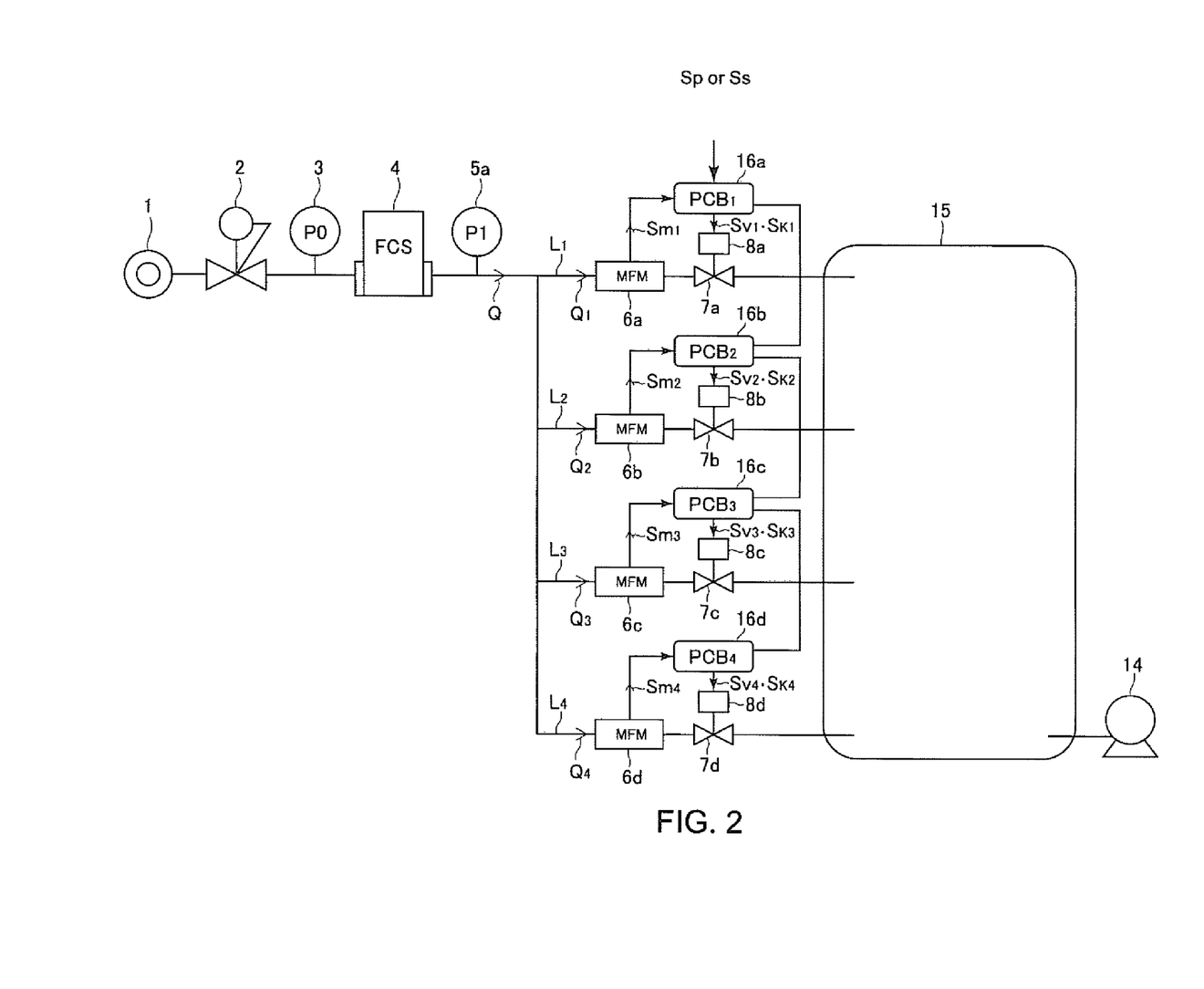
FIG. 2 is a descriptive schematic view of a gas dividing/supplying apparatus according to an embodiment of the present invention.

The present invention has been created based on analysis results of data obtained by using the evaluation testing apparatus shown in FIG. 1, and aims to prevent overshooting that is caused when gas starts to be admitted, which results from the control time delay of the motor-operated valve 7 by maintaining the motor-operated valve 7 at a predetermined fixed valve opening degree (which is an intermediate degree of valve opening that is between the fully opened state and the fully closed state) without bringing the valve opening degree of the motor-operated valve 7 disposed in each divided flow passage into the fully opened state when gas starts to be admitted in the same way as in the conventional technique. Thus, the invention according to a first non-limiting illustrative embodiment pertains to an apparatus for dividing and supplying gas that is characterized by including a pressure-type flow control system 4, a plurality of divided flow passages $L_1$ to $L_n$ that are connected in parallel with each other and through which gas flowing from the pressure-type flow control system 4 is divided and supplied to a process chamber 15, thermal-type mass flow sensors (MFMs) 6a to 6n disposed in the divided flow passages $L_1$ to $L_n$, respectively, motor-operated valves 7a to 7n disposed on a downstream side of the thermal-type mass flow sensors (MFMs) 6a to 6n, respectively, and switching-type controllers 16a to 16n that control the opening and the closing of the motor-operated valves 7a to 7n, respectively, and that is characterized in that the switching-type controllers 16a to 16n perform switching between valve opening control for maintaining the motor-operated valves 7a to 7n at a predetermined fixed valve opening degree based on a valve opening control command signal Sp and divided flow control for regulating an opening degree of each of the motor-operated valves 7a to 7n by feedback control based on a flow detection signal Sm of the thermal-type mass flow sensor (MFM) 6 by a divided flow control command signal Ss. In a preferred embodiment, in accordance with the present invention, n=4 as shown in FIG. 2.

The invention according to a second non-limiting illustrative embodiment is characterized in that, in the apparatus for dividing and supplying gas of the first non-limiting embodiment, the switching-type controllers 16a to 16n automatically or manually perform switching to the valve opening control when the pressure-type flow control system 4 is in a state in which flow has not been controlled and the switching-type controllers 16a to 16n perform switching to the divided flow control when the pressure-type flow control system 4 is in a state in which flow has been controlled.

The invention according to a third non-limiting illustrative embodiment is characterized in that, in the apparatus for dividing and supplying gas of the first non-limiting embodiment, a valve opening degree (%) of the motor-operated valve 7 is steadily operated at a set flow quantity that is pre-read, and this pre-read valve opening degree is set as a predetermined valve opening degree during the valve opening control.

The invention according to a fourth non-limiting illustrative embodiment is characterized in that, in the apparatus for dividing and supplying gas of the first non-limiting embodiment, the number of the divided flow passages falls within a range of one to four.

The invention according to a fifth non-limiting illustrative embodiment is a method for dividing and supplying gas, and the method is characterized by including the steps of, for instance, (a) in supply of divided flows of gas using the apparatus for dividing and supplying gas according to the first non-limiting embodiment, (b) maintaining an opening degree of each of the motor-operated valves 7a to 7n at a predetermined fixed opening degree through the switching-type controller 16 before the pressure-type flow control system 4 operates, and (c) thereafter subjecting the opening degree of each of the motor-operated valves 7a to 7n to feedback control based on a flow detection signal Sm emitted from the thermal-type mass flow sensors (MFMs) 6a to 6n through the switching-type controller 16 when flow control of a total flow quantity Q is performed by operation of the flow control system 4, and (d) supplying set-divided flow quantities $Q_1$ to $Q_n$ of gas to the divided flow passages, respectively.

The invention according to a sixth non-limiting illustrative embodiment is characterized in that, in the method according to the fifth non-limiting embodiment, the number of the divided flow passages is arranged to fall within a range of one to four, and the valve opening degree of the motor-operated valves 7 during the valve opening control is set at 40% to 70% of that of the valves that have been fully opened.

Effects of the Invention

In the present invention, switching in the opening and closing control of the motor-operated valves 7a to 7n disposed on the downstream side of the thermal-type mass flow sensors (MFMs) 6a to 6n of the divided flow passages is performed in such a way that the motor-operated valves 7a to 7n are maintained at a predetermined fixed opening degree without fully opening the motor-operated valves 7a to 7n when the pressure-type flow control system 4 that controls a total flow quantity Q of gas is in a non-operational state, whereas the motor-operated valves 7a to 7n undergo divided flow control by feedback control based on a flow detection signal Sm of the thermal-type mass flow sensors (MFMs) 6a to 6n when the pressure-type flow control system 4 is in an operational state and when the total flow quantity Q of gas has undergone flow control.

As a result, transitional flow-in (i.e., overshooting) of divided flows of gas occurring when the gas starts to be admitted into the divided flow passages $L_1$ to $L_n$ is completely prevented, and the gas can be supplied to the process chamber 13 through the divided flow passages $L_1$ to $L_n$ under highly accurate divided flow control, thus making it possible to manufacture higher-quality semiconductor products. Additionally, the switching-type controller 16 itself is merely required to be simple in structure and, therefore, a substantial rise in production costs, etc., is avoided.

DETAILED DESCRIPTION OF THE INVENTION

Modes for Carrying Out the Invention

An embodiment of the present invention will be hereinafter described with reference to the drawings, wherein like parts are designated by like character references. FIG. 2 is a schematic view showing the whole structure of a gas dividing/supplying apparatus according to the present invention, and, in the present embodiment, predetermined flow quantities $Q_1$ to $Q_4$ of gas G are supplied to a large-sized process chamber 15 through divided flow passages $L_1$ to $L_4$ of four systems ($L_1$ to $L_n$ wherein n=4). In the apparatus of FIG. 2, the same reference symbol is given to the same component or the same member as in FIG. 1, FIG. 8, etc. In FIG. 2, reference symbol 15 designates the large-sized process chamber, reference symbols 16a to 16d designate switching-type controllers, reference symbols $Sv_1$ to $Sv_4$ designate valve driving signals, and reference symbols $Sk_1$ to $Sk_4$ designate valve opening control signals.

Referring to FIG. 2, in a steady state, gas G that has been emitted from a gas supply source 1 and that has been regulated by a pressure regulator 2 so as to have a pressure of 300 to 500 Kpa·abs is controlled to have a desired set flow quantity Q (e.g., 1000 to 3000 sccm) in the pressure-type flow control system 4, and is supplied to the divided flow passages $L_1$ to $L_4$.

In the divided flow passages $L_1$ to $L_4$, a divided flow control command signal Ss is input, and thereafter valve driving signals $Sv_1$ to $Sv_4$ are respectively input to valve drive units 8a to 8d from switching-type controllers 16a to 16d in which feedback divided flow control is performed, and motor-operated valves 7a to 7d are driven, and, as a result, divided flow quantities $Q_1$ to $Q_4$ of gas corresponding to flow setting signals $Sa_1$ to $Sa_4$, respectively, are supplied to the chamber 15. In other words, the valve driving signals $Sv_1$ to $Sv_4$ are subjected to feedback control by means of the flow detection signals $Sm_1$ to $Sm_4$ emitted from the thermal-type mass flow sensors (MFMs) 6a to 6d, respectively, and, as a result, the divided flow quantities $Q_1$ to $Q_4$ of gas are controlled to have set-divided flow quantities corresponding to the flow setting signals $Sa_1$ to $Sa_4$, respectively.

When the pressure-type flow control system 4 supplies gas to the divided flow passages $L_1$ to $L_4$ in a state in which its flow has not been controlled, as in a case in which gas G temporarily stops being supplied, and then is again supplied (i.e., when gas starts to be admitted), an opening control command signal Sp is first input to each of the switching-type controllers 16a to 16d, thereby maintaining a state in which the switching-type controllers 16a to 16d can perform the opening control of the motor-operated valves 7a to 7d.

As a result, as described later, valve opening control signals $Sk_1$ to $Sk_4$ are output to the valve drive units 8a to 8d of the motor-operated valves 7a to 7d from the switching-type controllers 16a to 16d, respectively, and the motor-operated valves 7a to 7d are kept in a valve open state in which each motor-operated valve has been closed to a predetermined opening degree without being completely opened (i.e., in a valve open state that is between the fully open state and the fully closed state).

When a state is reached in which flow control is performed by the pressure-type flow control system 4 after a fixed time elapses (e.g., 0.1 seconds to 1 second) and in which a controlled-flow quantity Q of gas that has undergone flow control is supplied, the switching-type controllers 16a to 16d are automatically (or manually) switched from a valve opening control state to a divided flow control state, and, as described above, divided flow quantities $Q_1$ to $Q_4$ of gas flowing through the divided flow passages $L_1$ to $L_4$ are controlled by means of feedback control based on flow detection signals $Sm_1$ to $Sm_4$ emitted from the thermal-type mass flow sensors (MFMs) 6a to 6d.

It should be noted that the predetermined valve opening control signals $Sk_1$ to $Sk_4$ are selected appropriately, for example, based on the flow quantity in the pressure-type flow control system 4 or the divided flow ratio ($Q_1/Q_2/Q_3/Q_4$). Additionally, in the present embodiment, a cam drive type open-close valve whose driving source is a pulse motor is used as each of the motor-operated valves 7a to 7d.

Figure 3:
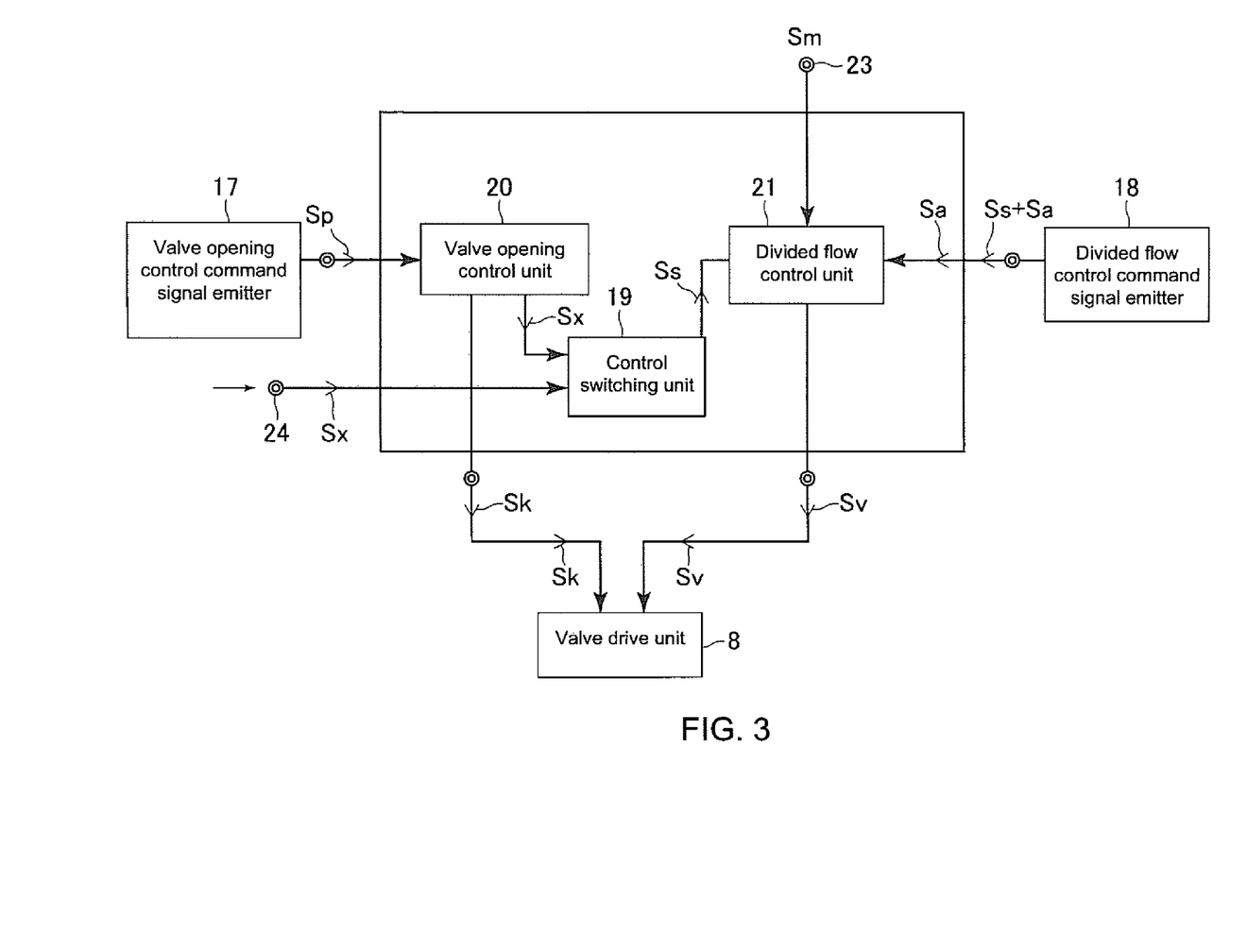
FIG. 3 is a descriptive schematic view of a structure and an operation of a switching-type controller used in the present invention.

FIG. 3 is a descriptive schematic view of a structure of the switching-type controller 16 used in the present embodiment, and, in FIG. 3, reference symbol 17 designates a valve opening control command signal emitter, reference symbol 18 designates a divided flow control command signal emitter, reference symbol 19 designates a control switching unit, reference symbol 20 designates a valve opening control unit, reference symbol 21 designates a divided flow control unit by a flow detection signal Sm emitted from the thermal-type mass flow sensor (MFM) 6, reference symbol 23 designates an input terminal of a flow detection signal Sm, and reference symbol 24 designates an input terminal of a control switching signal Sx emitted from the pressure-type flow control system 4.

When gas starts to be admitted (i.e., when the pressure-type flow control system 4 supplies gas to the divided flow passages in a state in which its flow has not been controlled), an opening control command signal Sp is first input from the valve opening control command signal emitter 17 to the valve opening control unit 20, and a valve opening control signal Sk predetermined here (e.g., 40% opening degree, 50% opening degree, etc.) is input from the unit 20 to the valve drive unit 8 so that the motor-operated valve 7 is maintained at a predetermined valve opening degree. Of course, the valve opening control command signal emitter 17 is provided with an input mechanism for the valve opening control signal Sk, so that the signals Sp and Sk may be in putted at the same time.

Figure 4:
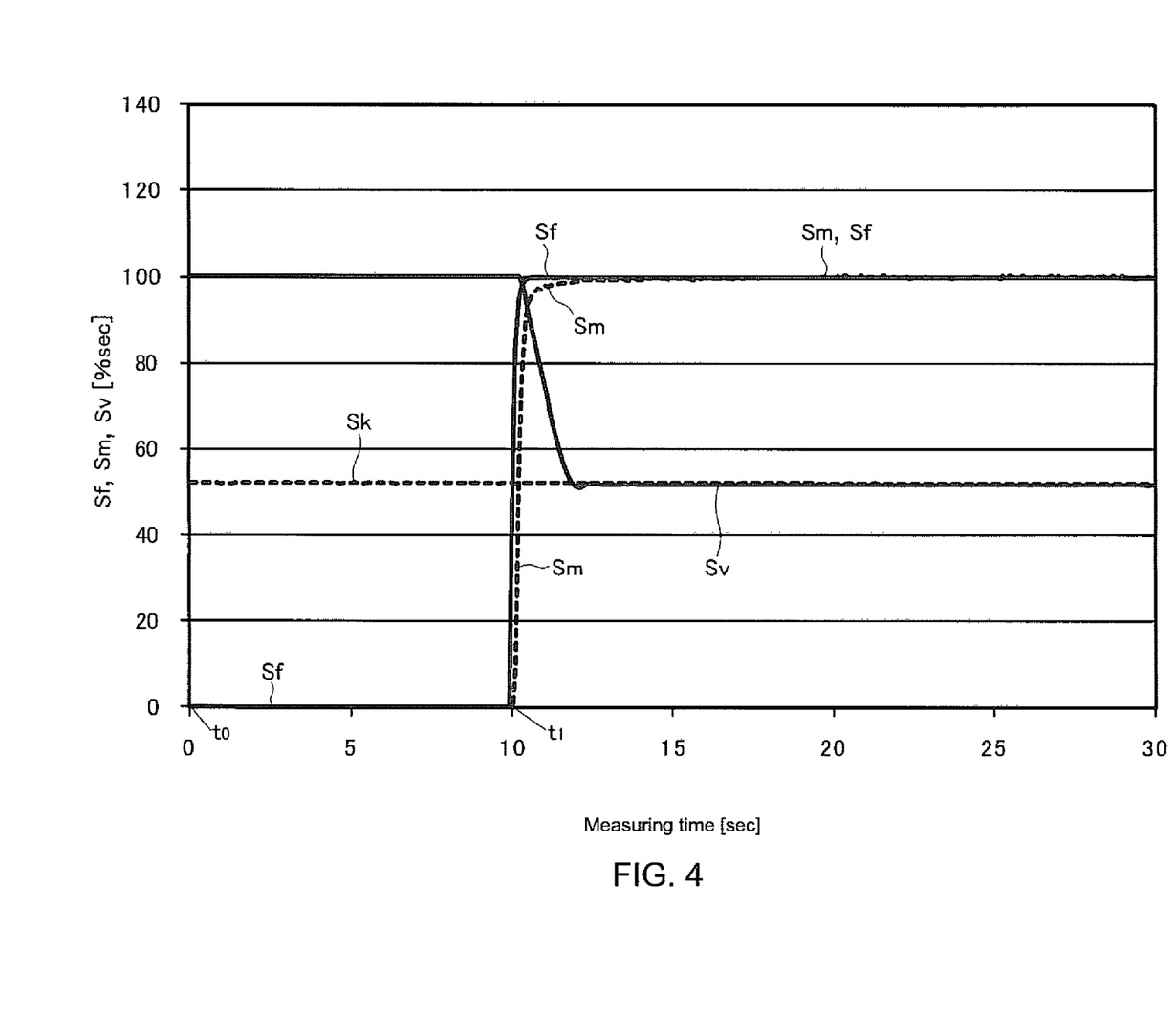
FIG. 4 is a descriptive graphical view of divided gas flow characteristics in gas admission according to an embodiment of the present invention.

When flow control is performed by the pressure-type flow control system 4, a control switching signal Sx is input from the terminal 24 to the control switching unit 19, and, based on this signal, a divided flow control command signal Ss is emitted, and the divided flow control unit 21 is actuated, and, based on a flow detection signal Sm emitted from the thermal-type mass flow sensor (MFM) 6 and a flow setting signal Sa emitted from a flow setting mechanism attached to the divided flow control command signal emitter 18, a valve driving signal Sv is subjected to feedback control, and the divided flow is controlled by the motor-operated valve 7. FIG. 4 schematically illustrates the various signals Sp, Sk, Sx, Sm, Sv, Ss and Sa that are transmitted by the various components of the system. As should be appreciated from the embodiment of FIG. 2 of this disclosure, because there are multiple flow passages $L_1$ to $L_4$ and multiple thermal-type mass flow sensors (MFMs) 6a to 6d, and multiple valve drive units 8a to 8d of the motor-operated valves 7a to 7d controlled by the corresponding switching-type controllers 16a to 16d according to the embodiment, there will be multiple signals with respect to flow detection signals $Sm_1$ to $Sm_4$ emitted from the thermal-type mass flow sensors (MFMs) 6a to 6d, respectively, and multiple valve opening control signals $Sk_1$ to $Sk_4$ outputted to the valve drive units 8a to 8d of the motor-operated valves 7a to 7d from the switching-type controllers 16a to 16d, as well as multiple valve driving signals $Sv_1$ to $Sv_4$ that are subjected to feedback control by means of the corresponding flow detection signals $Sm_1$ to $Sm_4$ emitted from the thermal-type mass flow sensors (MFMs) 6a to 6d and, as a result, the divided flow quantities $Q_1$ to $Q_4$ of gas are controlled to have set-divided flow quantities corresponding to the flow setting signals $Sa_1$ to $Sa_4$, respectively.

Of course, switching to divided flow control by means of the divided flow control unit 21 can also be performed by automatically emitting a control switching signal Sx when a fixed time elapses after the actuation of the valve opening control unit 20, or may be performed by inputting a command signal Ss from the divided flow control command signal emitter 18.

FIG. 4 shows a result of divided flow control when gas starts to be admitted according to the embodiment of the present invention, in which the valve opening degree is first controlled by the valve opening control unit 20 from the fully opened state (100% open) to a 52% opening degree (partially opened), and thereafter divided flow quantities $Q_1$ to $Q_4$ of gas are subjected to flow control (feedback flow control) at time $t_1$ by means of the divided flow control unit 21.

As is apparent from FIG. 4, a peak, such as the peak SmP of a characteristic curve appearing when opening control in the conventional apparatus shown in FIG. 9 is not performed, is not seen in the flow detection signal Sm of the thermal-type mass flow sensor (MFM) 6, and it is understandable that gas can be completely prevented from causing overshooting in the divided flow passage by appropriately reducing the opening degree of the motor-operated valve 7. In FIG. 4, a curve Sf is a flow output curve of the pressure-type flow control system 4.

Preferably, the valve opening degree (i.e., valve opening control signal Sk) is set in such a way that the valve opening degree of the motor-operated valve 7 is preserved in a memory when flow control is performed for a target flow quantity (i.e., flow setting signal Sa) by use of the gas dividing/supplying apparatus, and the valve opening degree preserved in the memory is pre-set and pre-input in the valve opening control unit 20 in the form of a valve opening control signal Sk, although the valve opening degree is set at 52% in the test of FIG. 4.

In sum then, it is an object of an embodiment of the present invention to provide a gas dividing/supplying apparatus that divides a flow of gas flowing from a pressure-type flow control system into flows of gas and supplying the flows of gas through a plurality of divided flow passages, wherein the gas is prevented from overshooting in the divided flow passages when the gas is admitted. This objective is achieved by means of the gas dividing/supplying apparatus that includes a pressure-type flow control system (4), a plurality of divided flow passages ($L_1$ to $L_n$) that are connected in parallel with each other and through which gas flowing from the pressure-type flow control system (4) is divided and supplied to a process chamber (15), and thermal-type mass flow sensors (MFMs) (6a to 6n) are disposed in the divided flow passages ($L_1$ to $L_n$), respectively, and motor-operated valves (7a to 7n) are disposed on a downstream side of the thermal-type mass flow sensors (MFMs) (6a to 6n), respectively, and switching-type controllers (16a to 16n) that control the opening and the closing of the motor-operated valves (7a to 7n), respectively, and, in the apparatus, the switching-type controllers (16a to 16n) perform switching between valve opening control for maintaining the motor-operated valves (7a to 7n) at a predetermined fixed valve opening degree based on a valve opening control command signal (Sp) and divided flow control for regulating an opening degree of each of the motor-operated valves (7a to 7n) by feedback control based on a flow detection signal (Sm) of the thermal-type mass flow sensor (MFM) (6) by a divided flow control command signal (Ss).

INDUSTRIAL APPLICABILITY

The present invention is widely applicable not only to a gas dividing/supplying apparatus for use in semiconductor manufacturing equipment but also, for example, to gas supply equipment for use in chemical products manufacturing equipment if this manufacturing equipment is the one that uses a flow control system for controlling a total flow quantity.

DESCRIPTION OF REFERENCE SYMBOLS

Q Total flow quantity
$Q_1$, $Q_n$ Divided flow quantity
$L_1$, $L_n$ Divided flow passage
Sa Flow setting signal
Sf Flow output of pressure-type flow control system
Sk, $Sk_1$ to $Sk_4$ Valve opening control signal
Sm Flow detection signal
Smp Peak of flow detection signal
Sp Opening control command signal
Ss Divided flow control command signal
Sv, $Sv_1$ to $Sv_4$ Valve driving signal
Sx Control switching signal
$t_0$ Input time point of flow setting signal Sa
$t_1$ Input time point of flow detection signal Sm
1 Gas supply source
2 Pressure regulator
3 Pressure sensor
4 Pressure-type flow control system FCS
5a, 5b Pressure gauges
6 Thermal-type mass flow sensor (MFM)
7 Motor-operated valve
8 Valve drive unit
9 Vacuum pump
10, 10a Throttle valves
11 Signal emitter
12 PID controller
13 Process chamber
14 Vacuum pump
15 Large-sized process chamber
16a to 16d Switching-type controller
17 Valve opening command signal emitter
18 Divided flow control command emitter
19 Control switching unit
20 Valve opening control unit
21 Divided flow control unit

The invention claimed is:

1. A method for dividing and supplying gas, wherein the method comprises:
providing an apparatus for dividing and supplying gas comprising,
(a) a pressure-type flow control system arranged to control a total flow quantity (Q) of a gas supplied to a process chamber,
(b) a plurality of divided flow passages that are connected in parallel with each other and through which gas flowing from the pressure-type flow control system is divided and supplied to the process chamber,
(c) a plurality of thermal-type mass flow sensors disposed in the divided flow passages, respectively,
(d) a plurality of motor-operated valves disposed on a downstream side of the plurality of thermal-type mass flow sensors respectively, and
(e) a plurality of switching-type controllers that control opening and closing of the plurality of motor-operated valves, respectively,
wherein the plurality of switching-type controllers perform switching between valve opening control for maintaining the plurality of motor-operated valves at a predetermined fixed valve opening degree in response to a valve opening control command signal (Sp), and divided flow control for regulating an opening degree of each of the plurality of motor-operated valves by feedback control based on a plurality of flow detection signals (Sm) provided by the plurality of thermal-type mass flow sensors and a divided flow control command signal (Ss),
wherein the motor-operated valves are configured such that the opening degree of each of the motor-operated valves is maintained at the predetermined fixed opening degree through the corresponding switching-type controller before the pressure-type flow control system operates, and
wherein upon switching from valve opening control to divided flow control, the flow of gas is controlled to the total flow quantity (Q) by the pressure-type flow control system;
subjecting the opening degree of each of the plurality of the motor-operated valves to feedback control based on a respective flow detection signal emitted from a corresponding one of the plurality of thermal-type mass flow sensors through the respective switching-type controller when flow control of the total flow quantity of gas is performed by operation of the flow control system; and
supplying divided flow quantities of gas that are set-flow quantities through the plurality of divided flow passages, wherein the number of the plurality of divided flow passages falls within a range of two to four, and a valve opening degree of each motor-operated valve during the valve opening control is set at 40% to 70% of the fully opened state of the valve, and wherein a control switching unit is provided to receive input of a control switching signal (Sx) either from a valve opening control unit or the pressure-type flow control system to output the divided flow control command signal (Ss).

2. The method for dividing and supplying gas according to claim 1, wherein the plurality of switching-type controllers automatically or manually perform switching to valve opening control when the pressure-type flow control system is in a state in which a flow of the gas has not been controlled to the total flow quantity (Q) of the gas and the plurality of switching-type controllers perform switching to divided flow control when the pressure-type flow control system is in a state in which the flow of the gas has been controlled.

3. The method for dividing and supplying gas according to claim 1, wherein a valve opening degree (%) of the motor-operated valve is steadily operated at a set flow quantity that is pre-read, and the pre-read valve opening degree is set as a predetermined valve opening degree during the valve opening control.

4. The method for dividing and supplying gas according to claim 1, wherein the switching type controllers each comprise,
  i. a valve opening control unit provided to receive input of the opening control command signal (Sp) and to output a predetermined valve opening control signal (Sk);
  ii. the control switching unit provided to receive input of a control switching signal (Sx) either from a valve opening control unit or the pressure-type flow control system and to output the divided flow control command signal (Ss); and
  iii. a divided flow control unit provided to receive input of the divided flow command signal (Ss) from the control switching unit and from outside, a flow setting signal (Sa) and a flow detection signal (Sm), to output a valve driving signal (Sv).

5. A method for dividing and supplying gas, wherein the method comprises:
  providing an apparatus for dividing and supplying gas comprising,
    (a) a pressure-type flow control system arranged to control a total flow quantity (Q) of a gas supplied to a process chamber,
    (b) a plurality of divided flow passages that are connected in parallel with each other and through which gas flowing from the pressure-type flow control system is divided and supplied to a process chamber,
    (c) a plurality of thermal-type mass flow sensors disposed in the divided flow passages, respectively,
    (d) a plurality of motor-operated valves disposed on a downstream side of the plurality of thermal-type mass flow sensors respectively, and
    (e) a plurality of switching-type controllers that control opening and closing of the plurality of motor-operated valves, respectively,
  wherein the plurality of switching-type controllers are configured to switch between valve opening control for maintaining the plurality of motor-operated valves at a predetermined fixed valve opening degree in response to a valve opening control command signal (Sp), and divided flow control for regulating an opening degree of each of the plurality of motor-operated valves by feedback control based on a plurality of flow detection signals (Sm) provided by the plurality of thermal-type mass flow sensors and a divided flow control command signal (Ss), and
  wherein the plurality of switching-type controllers are configured to automatically or manually perform switching to valve opening control when the pressure-type flow control system is in a state in which a flow of the gas has not been controlled and the plurality of switching-type controllers perform switching to divided flow control when the pressure-type flow control system is in a state in which the flow of the gas has been controlled;
  subjecting the opening degree of each of the plurality of the motor-operated valves to feedback control based on a respective flow detection signal emitted from a corresponding one of the plurality of thermal-type mass flow sensors through the respective switching-type controller when flow control of the total flow quantity of gas is performed by operation of the flow control system; and
  supplying divided flow quantities of gas that are set-flow quantities through the plurality of divided flow passages,
  wherein the number of the plurality of divided flow passages falls within a range of two to four, and a valve opening degree of each motor-operated valve during the valve opening control is set at 40% to 70% of the fully opened state of the valve, and
  wherein a control switching unit is provided to receive input of a control switching signal (Sx) either from a valve opening control unit or the pressure-type flow control system to output the divided flow control command signal (Ss).

6. A method for dividing and supplying gas, wherein the method comprises:
  providing an apparatus for dividing and supplying gas comprising,
    (a) a pressure-type flow control system arranged to control a total flow quantity (Q) of a gas supplied to a process chamber,
    (b) a plurality of divided flow passages that are connected in parallel with each other and through which gas flowing from the pressure-type flow control system is divided and supplied to the process chamber,
    (c) a plurality of thermal-type mass flow sensors disposed in the divided flow passages, respectively,
    (d) a plurality of motor-operated valves disposed on a downstream side of the plurality of thermal-type mass flow sensors respectively, and
    (e) a plurality of switching-type controllers that control opening and closing of the plurality of motor-operated valves, respectively,
  wherein the plurality of switching-type controllers perform switching between valve opening control for maintaining the plurality of motor-operated valves at a predetermined fixed valve opening degree set at 40% to 70% of the fully opened state of the valve in response to a valve opening control command signal (Sp), and divided flow control for regulating an opening degree of each of the plurality of motor-operated valves by feedback control based on a plurality of flow detection signals (Sm) provided by the plurality of thermal-type mass flow sensors and a divided flow control command signal (Ss) or a control switching signal (Sx) provided by the pressure-type flow control system,
  wherein the motor-operated valves are configured such that the opening degree of each of the motor-operated valves is maintained at the predetermined fixed opening degree through the corresponding switching-type controller before the pressure-type flow control system operates, and wherein upon switching from valve opening control to divided flow control, the flow of gas is controlled to the total flow quantity (Q) by the pressure-type flow control system;

subjecting the opening degree of each of the plurality of the motor-operated valves to feedback control based on a respective flow detection signal emitted from a corresponding one of the plurality of thermal-type mass flow sensors through the respective switching-type controller when flow control of the total flow quantity of gas is performed by operation of the flow control system; and supplying divided flow quantities of gas that are set-flow quantities through the plurality of divided flow passages, wherein the number of the plurality of divided flow passages falls within a range of two to four, and a valve opening degree of each motor-operated valve during the valve opening control is set at 40% to 70% of the fully opened state of the valve, and wherein a control switching unit is provided to receive input of the control switching signal (Sx) either from a valve opening control unit or the pressure-type flow control system to output the divided flow control command signal (Ss).

* * * * *